June 7, 1932.  W. E. HOKE  1,862,145
MEANS FOR AND METHOD OF GAUGING SCREW THREADS
Filed Aug. 15, 1929  2 Sheets-Sheet 1
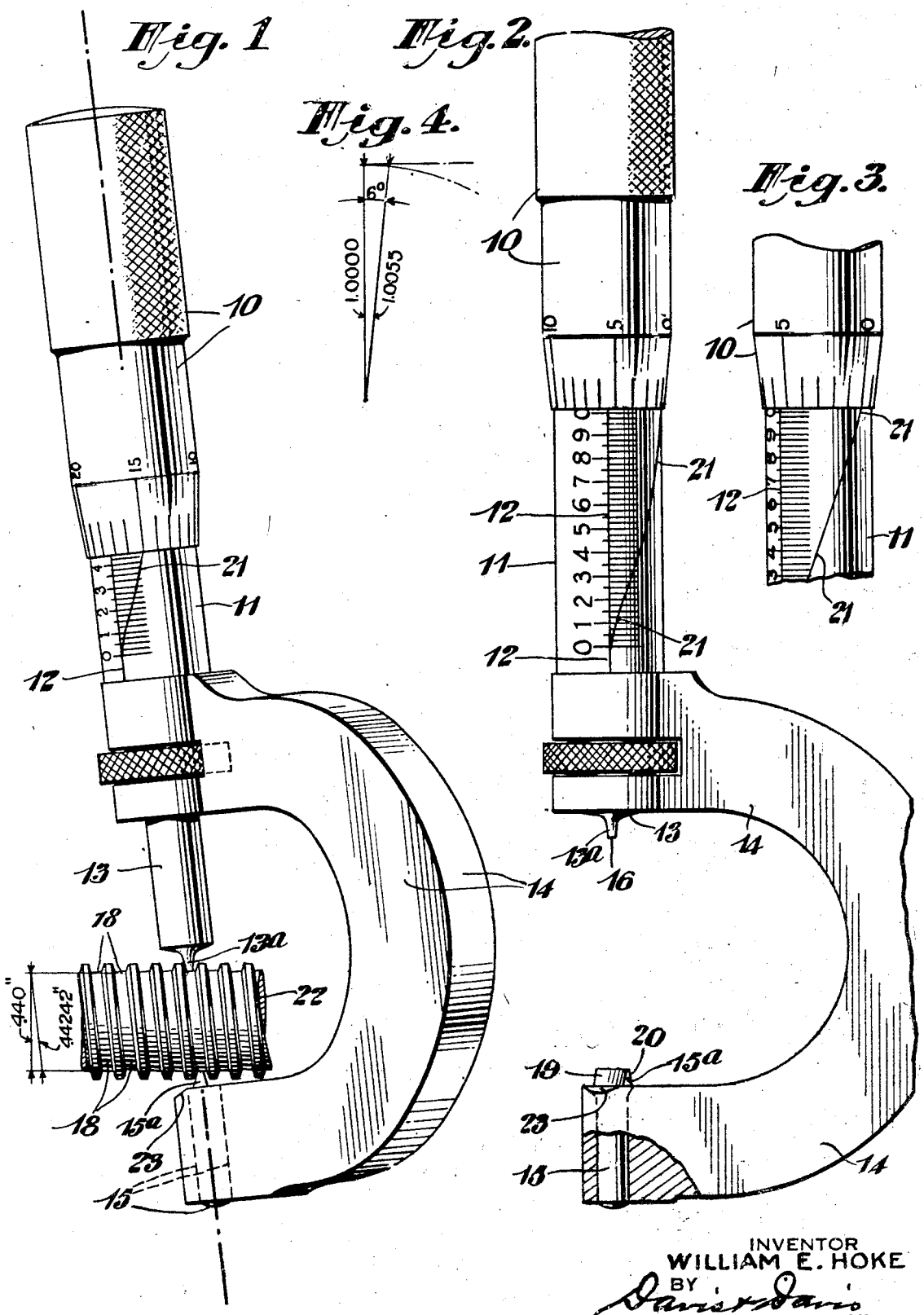
INVENTOR
WILLIAM E. HOKE
BY
ATTORNEYS

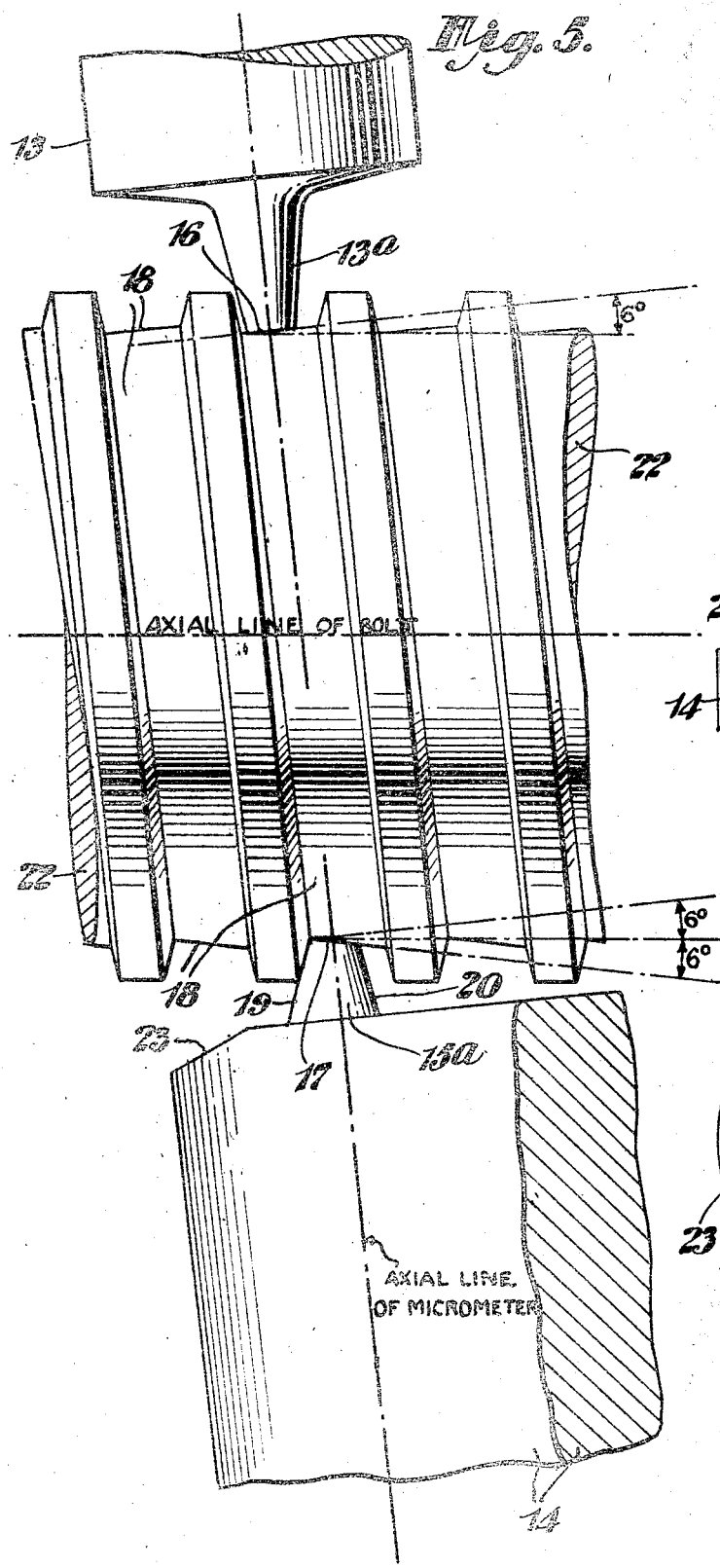
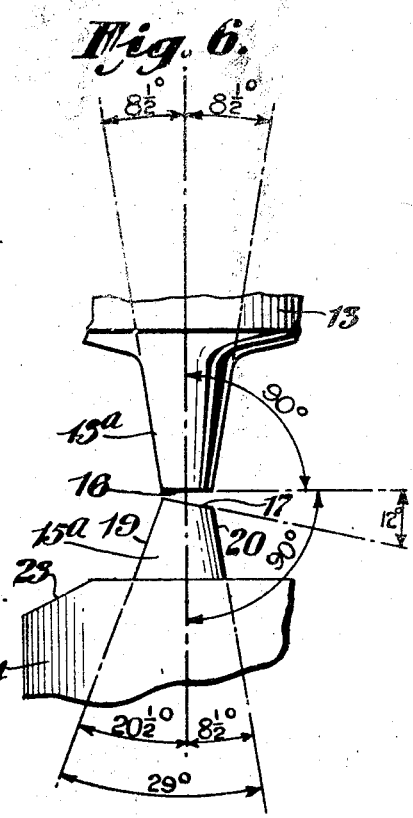
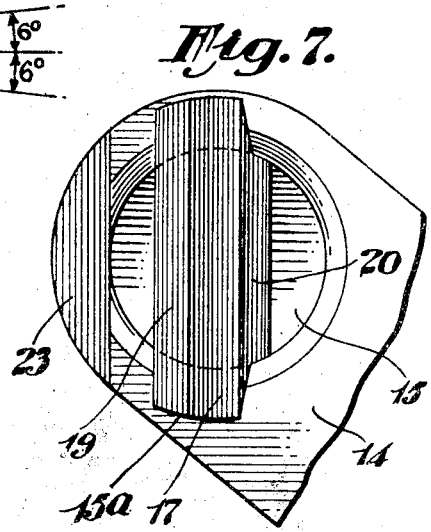

Patented June 7, 1932

1,862,145

UNITED STATES PATENT OFFICE

WILLIAM E. HOKE, OF BALTIMORE, MARYLAND, ASSIGNOR TO DARDELET THREAD-LOCK CORPORATION, OF NEW YORK, N. Y., A CORPORATION OF DELAWARE

MEANS FOR AND METHOD OF GAUGING SCREW THREADS

Application filed August 15, 1929. Serial No. 386,078.

This invention relates to improvements in means for and methods of gauging and ascertaining the minor diameter, or minimum root diameter of external screw threads having oblique helicoidal root surfaces, particularly standard Dardelet screw threads on bolts or other externally threaded parts, and tap threads on taps for cutting standard internal Dardelet threads.

The principal objects of the invention are to provide a means and method whereby it may be readily determined with precision whether the minor diameter or minimum root diameter, conforms with a predetermined standard; to provide a means and method whereby the exact minimum root diameter may be ascertained; to provide a micrometer caliper for measuring such threads so modified as to enable the exact minimum root diameter to be read thereon; and to provide a micrometer for the purpose set forth adapted for use with a wide range of sizes of Dardelet threads.

A further object of the invention is to adapt, with a minimum of change, micrometer calipers of usual construction for the gauging of Dardelet threads. Other objects and advantages of the invention will appear from the following description of the preferred embodiment of the invention illustrated in the accompanying drawings.

In the drawings:

Fig. 1 is a view showing the improved micrometer applied to a Dardelet bolt;

Fig. 2 a side elevation of the micrometer on a larger scale and at a different setting from that shown in Fig. 1;

Fig. 3 a fragmentary view of the micrometer set as in Fig. 2;

Fig. 4 a diagrammatic view illustrating the basis for laying out the auxiliary reading line on the sleeve;

Fig. 5 a fragmentary view on an enlarged scale showing the spindle and anvil engaged with the bolt thread as in Fig. 1;

Fig. 6 a detail view of the anvil and spindle as viewed from an end of the projecting top of the anvil; and Fig. 7 a top plan view of the anvil and anvil supporting end of the frame.

The threaded part illustrated is a portion of the threaded shank 22 of a standard Dardelet one-half inch bolt the thread of which has a minor diameter, or minimum root diameter of .440 inches. The standard Dardelet thread has a rib the side faces of which each make an angle of 14½ degrees with a perpendicular to the axial line of the thread, and of the bolt in the case of a bolt thread, and an oblique helicoidal root surface sloping at an angle of 6 degrees to the axial line of the bolt, the included angle of the helicoidal root surface being 12 degrees. The root surface of the external Dardelet threads is a friction locking surface and is conoidal. It is desirable that this conoidal surface shall, on all manufactured parts, such as bolts, having threaded portions of a given diameter, conform closely to a determined standard size. For this reason simple, efficient and accurate gauging or measuring of the root dimensions of threaded parts is desirable, and a purpose of the present invention is to provide for such gauging and measuring of external Dardelet threads by gauging and/or measuring the minor diameter or minimum root diameter thereof, preferably with a micrometer caliper. A further purpose of the invention is to adapt a micrometer caliper of standard construction, with a minimum of changes, for such gauging and measuring and to permit its use for all sizes (or a large range of sizes) of threads within the measuring range of the micrometer.

Such a micrometer is shown in the drawings, the micrometer being of the ordinary construction except for the top portion of the anvil, the bottom portion of the spindle, and the auxiliary zero line on its sleeve. The thimble 10 has the usual 25 spaces circumferential scale at its lower end, and the sleeve 11 has the usual axial scale and the usual axial zero reading line 12. The thimble axially moves the usual spindle 13 at the usual rate of 1/40th of an inch per turn of the thimble which itself moves axially of the sleeve during four turns thereof the distance between two of the longest graduations of the axial scale on the sleeve, e. g. from "0" to "1", as usual.

The usual frame 14 supports the anvil 15 in axial register with the spindle in the ordinary manner, and also supports the stationary sleeve 11. So far as above described the micrometer is of well known construction, and the novel features of construction will now be described.

The lower or protruding end of the spindle is substantially reduced in diameter in such manner as to form a frusto-conical thread groove entering portion 13ᵃ of substantial length and small diameter to adapt its bottom face to seat on the root surface of thread grooves varying considerably in depth and width. All tangent planes to the cone surface of portion 13ᵃ make an angle of 8½ degrees with the axial line of the micrometer so as to lie substantially parallel with the sides of the thread groove in the measuring position of the micrometer, in which position the axial line of the micrometer is tilted at an angle of 6 degrees to a perpendicular to the axial line of the Dardelet thread and bolt, as shown. The bottom plane face 16 of the spindle is perpendicular to the axis of the spindle, as usual, but of much smaller area.

The protruding top portion 15ᵃ of the anvil 15 has a plane top face 17 directly opposed to the plane bottom face 16 of the spindle but making an angle of 12 degrees therewith, instead of being parallel therewith as usual. The 12 degree angle of root surface contacting face 17 to root surface contacting face 16, and to a perpendicular to the axial line of the micrometer, is thus equal to the included angle of the oblique helicoidal root surface 18 of the standard Dardelet threads this micrometer is designed to gauge, so that when said plane surfaces 16 and 17 seat on the root surface 18 of the standard Dardelet external thread at diametrically opposite points (as shown in Figs. 1 and 5), the axial line of the micrometer is caused to assume a predetermined angle (in the described and shown instance, an angle of 6 degrees) to a perpendicular to the axial line of the thread and bolt. As this angle corresponds with the angle of the helicoidal root surface 18 to the axial line of the thread and bolt, the spindle may revolve while touching the root surface in setting the micrometer in accurate calipering adjustment, without disturbing the angle of tilt of the micrometer to the bolt.

Top portion 15ᵃ of the anvil is usually enlarged and of cylindrical form with a top face parallel with the bottom face of the spindle. In the micrometer shown, the enlarged cylindrical top portion is machined at opposite sides to form plane side faces 19 and 20 extending downward and outward from the higher and lower longitudinal edges of the top face 17. Side face 19 makes an angle of 20½ degrees with the axial line of the micrometer, and side face 20 makes an angle of 8½ degrees with said axial line, the included angle of 29 degrees between said faces being thus equal to the included angle between the walls of the standard Dardelet thread groove, and side face 19 being so disposed as to seat against that side wall of the groove extending along the deeper side of the groove while side face 20 lies parallel with the profile line of the opposite wall of the groove.

It will be observed, from Fig. 6, that the periphery of face 16 of the spindle does not extend laterally beyond or overhang either longitudinal edge of face 17 of the anvil. This arrangement permits face 16 to seat on surface 18 at various widthwise points on said root surface of the threads of different standard diameters, and thus permits use of a single micrometer for measuring Dardelet threads for bolts or the like having a wide range of sizes, and by making surface 17 sufficiently narrow, all sizes of Dardelet threads within the maximum and minimum range of its anvil and spindle dsplacement may be gauged or measured with the same micrometer.

It will be observed from Figs. 1 and 5 that the calipering is done, or the measurement is actually taken at an angle of six degrees to a perpendicular to the axis of the thread and bolt with the anvil seated in the lowest or deepest part of the thread groove, and also that this "cocked measurement" of the oblique helicoidal root surface will be an accurate measurement of the distance between two diametrically opposite points at the bottom of the groove along the deepest edge of the groove irrespective of where face 16 of the spindle is located widthwise of the groove. By regarding this "cocked measurement", which is directly readable on the usual scales in conjunction with the usual axial zero reading line on the sleeve, as the length of the secant of an angle of 6 degrees (the angle with a perpendicular to the axial line of the oblique helicoidal surface at which the measurement was taken), and deducting therefrom the ex-secant dimension of the same angle, the true minor diameter or minimum root diameter of the measured thread may be ascertained.

It is desirable to avoid the necessary mathematical calculations, or the use of extensive prepared tables necessary for ascertaining the actual minor diameter of a measured thread. This may be accomplished by calibrating the micrometer to afford a corrected reading of the true minor diameter of measured threads. In the construction shown this calibration is effected in a simple and efficient way on a micrometer provided with the usual system of graduations by etching or otherwise placing on the sleeve of said micrometer an auxiliary or correction zero reading line 21.

The auxiliary zero line 21 is a helical line of constant pitch on the cylindrical sleeve 11, the lower end of said line intersecting the axial zero line 12 on the sleeve at the "0" graduation of the sleeve scale adjacent the lower end of the sleeve. Line 21 diverges uniformly from line 12 toward the right as viewed in Figs. 1 to 3, i. e. in a direction affording a minus or lesser reading by the use of said line 21 in conjunction with the thimble and thimble scale. By making the pitch of helical line 21 such that at a normal reading of 1.0055 the line coincides at the lower edge of the thimble with the "0"' graduation of the thimble scale, the actual minor diameters of all sizes of threads within the measuring range of the micrometer may be directly read by using the ordinary scales of the micrometer in the ordinary way in conjunction with the helical zero line instead of the axial zero line, while the actual measurement along the cocked calipering line may be read in the ordinary manner. The improved calibrated micrometer is thus in effect a calculator or calculating register which deducts the exsecant linear measurement from the cocked or secant measurement actually taken through the bolt or other externally threaded part.

It will be observed that the micrometer may be used as an adjustable comparator thread gauge for gauging various sizes of threads to determine whether they conform to the established standard sizes. For example, by setting the micrometer to the reading shown in Fig. 1 for a standard ½ inch bolt thread the correct minor diameter of which is .440, and applying it successively while so set, to a number of manufactured bolts in the position shown, it can readily be seen, in the case of each such bolt, whether its minor diameter is equal to, greater, or less than, the standard minor diameter. If it be desired to ascertain the amount of variation from standard, it is simply necessary to advance or retract the spindle to the extent necessary for correct calipering, and note the variation between the standard reading and the final or actual reading with the spindle and anvil seated as shown in Figs. 1 and 5.

It will be obvious that the improvements are applicable to various known commercial forms of micrometers and that micrometers embodying the principle of the invention may be readily constructed for measuring threads having oblique surfaces, the profiles of which threads vary from the specific profile of the standard Dardelet thread shown, and that micrometers embodying the invention may be employed for calipering other oblique helicoidal surfaces, and for ascertaining the minor diameter of tap threads on taps threaded for cutting internal Dardelet threads.

In measuring a thread, the threaded member is disposed transversely of face 17 with the lowest portion of the thread root surface seated on the plane anvil top face 17 which is inclined at an angle of 12 degrees to the plane bottom face 16 of the member 13, which latter member is movable endwise or axially toward and from the face 17, and the face 16 of member 13 is seated upon the thread root surface at a position opposite face 17 to caliper the root surface along a line across the threaded member making an angle of 6 degrees with a perpendicular to the axial line of the thread and threaded portion of the threaded member.

By providing angularly disposed plane faces 16 and 17 for contacting the oblique helicoidal surface, that are of appreciable width in the direction of the axial line of the oblique helicoidal surface when contacting said surface in their calipering positions, it is ensured that the calipering will be done along a line at the proper fixed angle to a perpendicular to said axial line, thus avoiding errors in measuring and gauging or comparing.

By giving the anvil face 17 the proper angle to face 16 with relation to the included angle of the oblique helicoidal surface, as described and shown, it is immaterial where face 16 seats widthwise of the groove or lengthwise of the axial line of the helicoidal surface, thus increasing the range of use of the coactive faces 16 and 17 of a given width for gauging screw threads of various sizes, and also facilitating quick and accurate gauging.

It will be observed that by the present invention provision is made for a micrometer caliper having work contacting opposed calipering plane surfaces coactive from edge to edge with an oblique helicoidal surface transversely of said plane surfaces, or in the direction of the axial line of the helicoidal surface, for calipering the helicoidal surface at a definite angle to a perpendicular to said axial line, which micrometer is calibrated for direct reading of the minor diameter of said helicoidal surface or the diameter of a right cylinder whose axis is coincident with that of the helicoidal surface and whose periphery touches that longitudinal edge of one of the plane surfaces which is closest to the other plane surface.

Preferably the top face of the lower jaw of the frame 14 is beveled or chamfered off as shown at 23 to avoid possible contact thereof with the crest of the rib of a thread in calipering the largest sizes of threads.

The reduced or narrow top portion 15$^a$ of the anvil 15 may extend lengthwise directly transversely of the lower jaw of frame 14 if desired. The biased arrangement of said portion 15ª shown, however, facilitates reading of the micrometer while applied to a bolt or the like, if it be desired to read the measurement of the root surface before separation of the micrometer and bolt.

What I claim is:

1. A micrometer caliper having a spindle, the contact end portion of which is reduced in diameter, and an anvil having a plane top contact face opposed to the contact end of the spindle and lying in a plane inclined to the axial line of the spindle and two opposite side plane faces diverging from opposite edges of its top contact face and lying in planes inclined to the axial line of the spindle, the width of the top face of the anvil being such that said face is not overhung by the bottom contact face of the spindle, and that side face of the anvil which merges with the edge of the top face of the anvil nearest the spindle making a greater angle with the axial line of the spindle than the other side face.

2. A micrometer caliper having a spindle, the contact end portion of which is reduced in diameter, and an anvil having a plane top contact face opposed to the contact end of the spindle and lying in a plane inclined to the axial line of the spindle and two opposite side plane faces diverging from opposite edges of its top contact face and lying in planes inclined to the axial line of the spindle, the width of the top face of the anvil being such that said face is not overhung by the bottom contact face of the spindle, and that side face of the anvil which merges with the edge of the top face of the anvil nearest the spindle making a greater angle with the axial line of the spindle than the other side face, said micrometer caliper being calibrated to afford a direct reading of the minor diameter of an oblique helicoidal thread root surface measured with the anvil side face of greatest angularity abutting that wall of the thread groove which extends along the deepest edge of the groove.

3. A micrometer caliper for measuring the minor diameter of screw threads with an oblique helicoidal root surface, having a spindle, the contact end portion of which is reduced in diameter, and an anvil having a plane top contact face opposed to the contact end of the spindle and lying in a plane inclined to the axial line of the spindle and two opposite side plane faces diverging from opposite edges of its top contact face and lying in planes inclined to the axial line of the spindle, the width of the top face of the anvil being such that said face is not overhung by the bottom contact face of the spindle, and that side face of the anvil which merges with the edge of the top face of the anvil nearest the spindle making a greater angle with the axial line of the spindle than the other side face, said micrometer caliper having a helical zero reading line and sleeve and thimble scales cooperative therewith for affording a reading of the minor diameter of the thread when measured with the inclined top face of the anvil seated in the deepest part of the thread groove and contacting the thread root surface throughout the width of said top face.

4. A micrometer caliper for gauging the minor diameter of a male screw thread having an oblique helicoidal root surface, characterized by the fact that the anvil and spindle of the micrometer caliper have plane root surface contacting faces at their adjacent ends, making an angle with each other corresponding with the angle included between diametrically opposite tangent planes to the root surface, one of said root surface contacting faces being perpendicular to the axis of the spindle, said micrometer having an auxiliary helical zero line of such pitch as to afford, in conjunction with the usual sleeve and thimble scales thereon, a direct corrected reading of the minor diameter of calipered screw threads.

5. A micrometer caliper having the usual sleeve and thimble graduations and also the usual axial zero line on the sleeve thereof, characterized by the fact that the opposed ends of its spindle and anvil have calipering plane surfaces making an angle with each other, and the further fact that its sleeve is provided with an auxiliary helical zero line of constant pitch diverging from the axial zero line toward the outer end of the sleeve at a rate and in a direction to give at a reading of unity on the auxiliary line an indicated divergence on the thimble scale corresponding with the ex-secant of an angle of one-half the magnitude of the angle between the calipering surfaces and a reading in conjunction with the axial zero line corresponding with the secant of the lesser angle.

6. The method of gauging minor diameters of screw threads having an oblique helicoidal root surface, which comprises interposing the root surface of the thread of a threaded part between two diametrically opposed root surface contacting faces relatively movable toward and from each other and relatively inclined in the direction of length of the threaded part at an angle equal to the included conic angle of the root surface with one edge of at least one of said faces at the edge of least diameter of the root surface and both said faces seated on the root surface, and observing the extent of relative displacement between said faces while so seated on the root surface.

7. The method of ascertaining the minor diameter of standard Dardelet external screw threads which comprises calipering the threaded part in a transverse plane which is perpendicular at one calipering point to a tangent plane of the thread root surface and which intersects the deepest part of the thread groove at the other calipering point, and deducting, from the distance thus measured, the ex-secant dimension of an angle of six degrees of which the calipered measurement is the secant dimension.

8. A root diameter measuring micrometer caliper for external Dardelet screw threads, characterized by the fact that the opposed spindle and anvil of said caliper have adjacent end portions for entering between turns of the thread and each having but a single root surface engaging end face, the end face of the anvil being a plane surface and said anvil being mounted to maintain its end face in a plane making a fixed angle with the perpendicular to the spindle axis corresponding with the predetermined included conic angle of the root portion of such threads.

9. A root diameter micrometer caliper for external Dardelet screw threads, comprising a frame, a spindle mounted in the frame, and an anvil having a root surface engaging plane end face and two opposite plane side faces converging toward the work engaging end of the spindle and joining respectively with two parallel side edges of the end face of the anvil and having an included angle of 29 degrees, the anvil being held to the frame to maintain its end face in a plane making an angle of 12 degrees with a perpendicular to the spindle axis and to maintain said plane side faces of the anvil in converging planes making respectively angles of 20½ degrees and 8½ degrees with the spindle axis.

10. A root diameter micrometer caliper for external Dardelet screw threads, as claimed in claim 9, characterized by the fact said caliper has, in conjunction with the usual sleeve and thimble scales and axial zero line of its sleeve, an auxiliary helical zero line of constant pitch extending from said axial zero line at the "0" graduation of the sleeve scale in a direction and at a rate to afford a corrected diameter reading deducting from the calipered measurement the ex-secant dimension of an angle of six degrees of which the calipered measurement is the secant dimension.

11. A micrometer for measuring the root diameter of Dardelet screw threads, comprising a frame, an axially movable spindle mounted on the frame and having a single thread root surface engaging end portion, and an anvil having a single thread root surface engaging end face opposed to said end portion of the spindle and also having a thread groove wall engaging side face, said anvil faces being plane faces arranged with an included angle of ninety eight and one-half degrees, and said anvil being mounted on the frame to maintain said end face thereof at an angle of twelve degrees with a perpendicular to the axial line of the spindle and to maintain said side face thereof at an angle of twenty and one-half degrees with the said axial line.

12. A micrometer caliper for measuring the root diameter of Dardelet screw threads, having an axially adjustable spindle with a thread groove entering end portion and an anvil opposed to the work engaging end of said spindle portion, said anvil having a thread groove entering portion with an elongated plane work engaging end face of constant width and two plane side faces converging toward the longitudinal edges of said end face, said end face making an angle of twelve degrees with a perpendicular to the spindle axis and the included angle between said converging side faces being twenty-nine degrees.

13. A micrometer caliper for gauging Dardelet screw threads, having an axially adjustable spindle provided with a frusto-conical thread groove entering portion with a plane work engaging end face perpendicular to the spindle axis and a periphery making an angle of eight and one-half degrees with said axis longitudinally of said portion, and an anvil opposed to said spindle and provided with a thread groove entering portion having two opposed plane side faces converging toward said spindle portion and making angles with the spindle axis respectively of twenty and one-half degrees and eight and one-half degrees, said anvil portion having a plane work engaging end face sloping between said side faces in a plane making an angle of twelve degrees with the plane end face of said spindle portion.

14. A micrometer caliper for gauging the minor diameter of external Dardelet screw threads, characterized by the fact that the anvil and spindle thereof each have but a single thread groove entering portion each provided with but a single thread root surface engaging end face, which end faces are plane faces making an angle of twelve degrees with each other and are arranged with one of said faces disposed in a plane perpendicular to the axis of the spindle and with the two faces opposed in the path of axial measuring adjustment of the spindle.

15. A micrometer caliper as claimed in claim 14, calibrated to afford in any calipering adjustment thereof a direct reading of the diameter of a right cylinder passing between and touching both said root surface engaging end faces without intersecting either face.

16. The method of measuring the root diameter of a screw thread which comprises measuring the thread root with a caliper in a plane oblique to the thread axis between two points on the root spaced one-half of one turn of the thread and deducting from the calipered dimension the excess over the root cylinder diameter due to the angle at which the root cylinder was calipered.

17. The method of measuring an oblique helicoidal surface of a screw thread which comprises calipering such thread surface between two points spaced one hundred and eighty degrees apart around the thread axis in a transverse plane inclined to a perpendicular to the thread axis at an angle corresponding with the angle of slope of said surface to the thread axis, and deducting from the measurement obtained by such calipering the ex-secant dimension of a corresponding angle whose secant dimension is that obtained by the calipering.

In testimony whereof I hereunto affix my signature.

WILLIAM E. HOKE.